Figure 1:
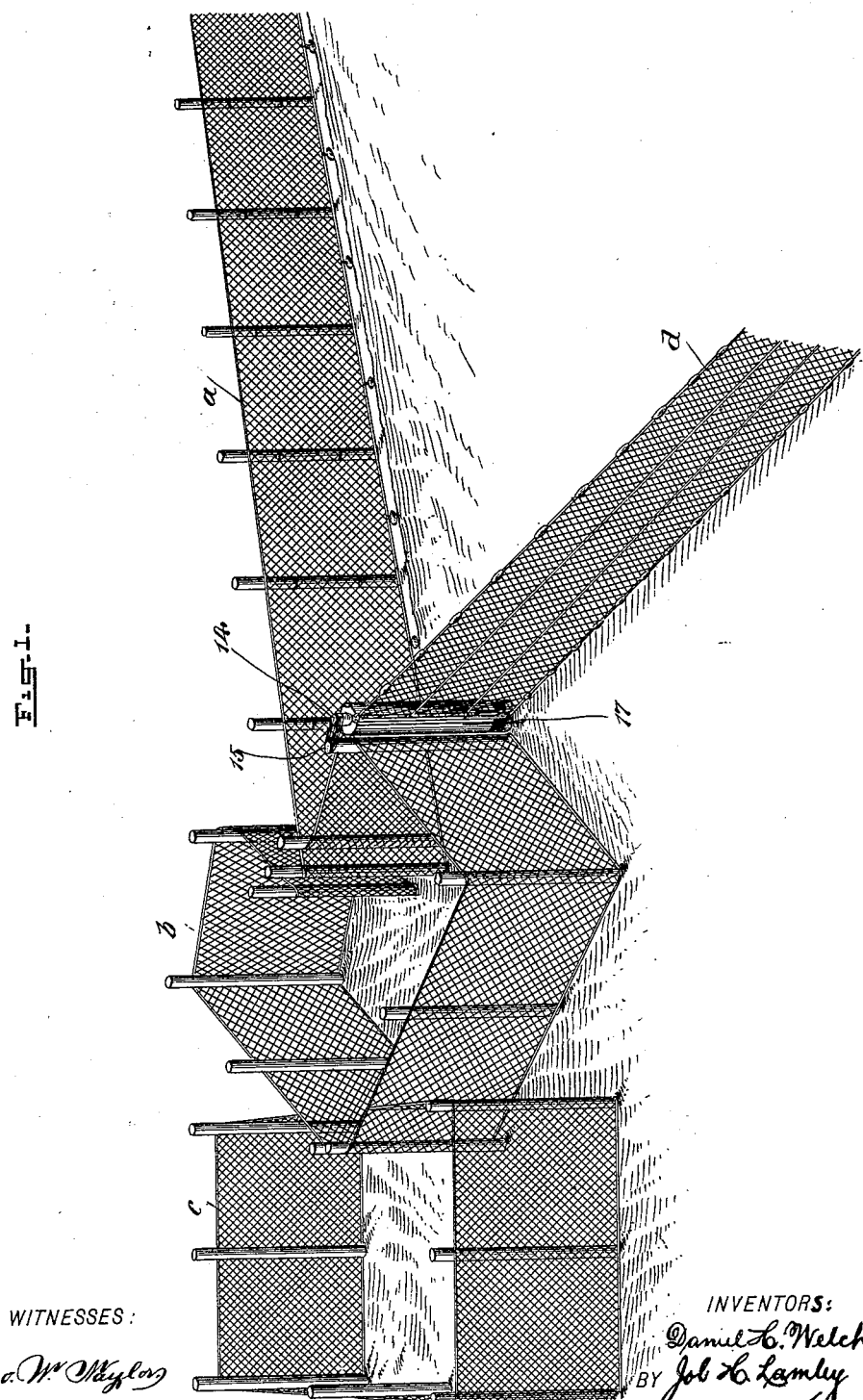

No. 667,472. Patented Feb. 5, 1901.
D. H. WELCH & J. H. LAMLEY.
FISH TRAP.
(Application filed Jan. 16, 1900.)
(No Model.) 3 Sheets—Sheet 1.

WITNESSES:

INVENTORS:
Daniel C. Welch
Job H. Lamley
BY
ATTORNEYS

No. 667,472. Patented Feb. 5, 1901.
D. H. WELCH & J. H. LAMLEY.
FISH TRAP.
(Application filed Jan. 18, 1900.)
(No Model.) 3 Sheets—Sheet 2.
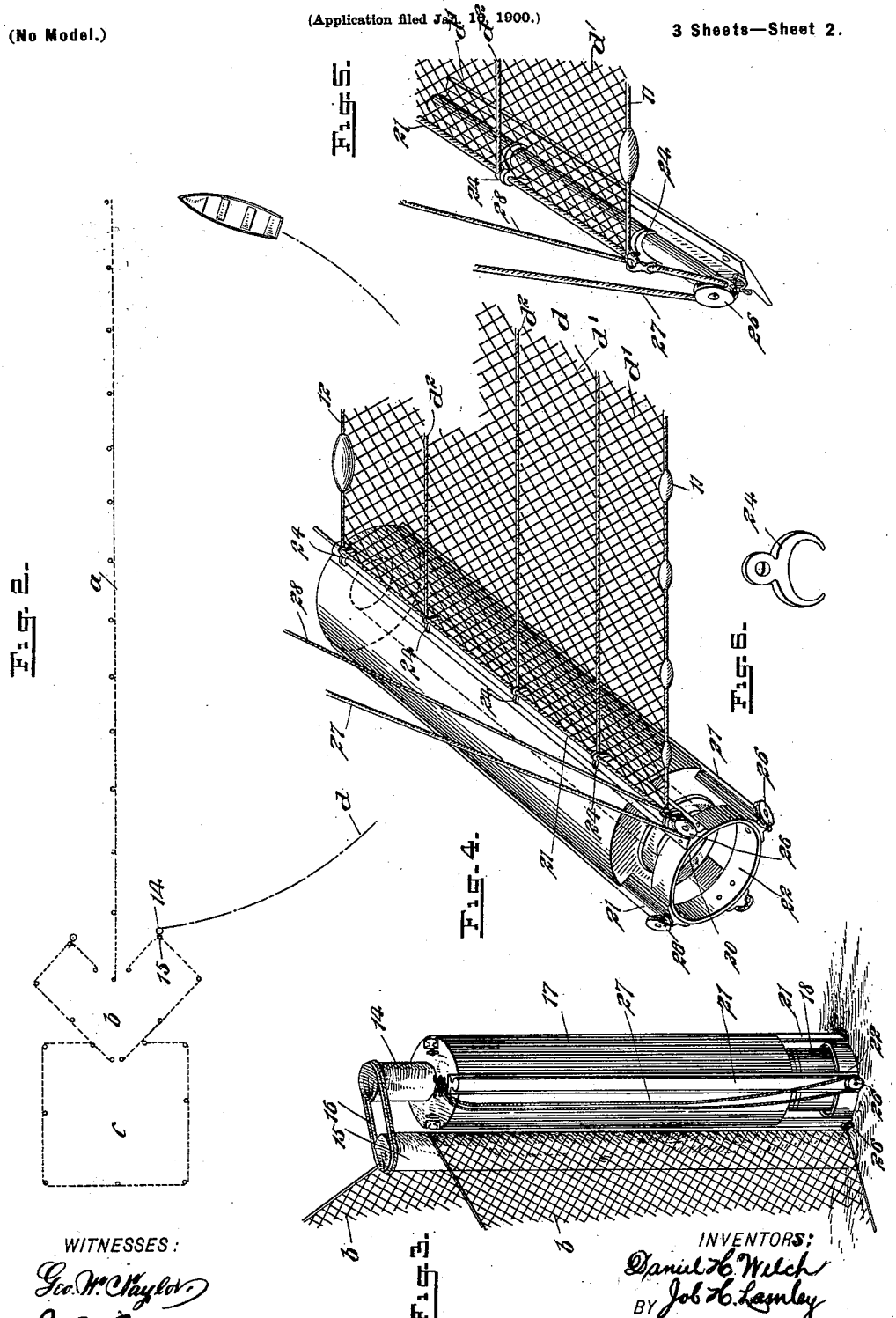

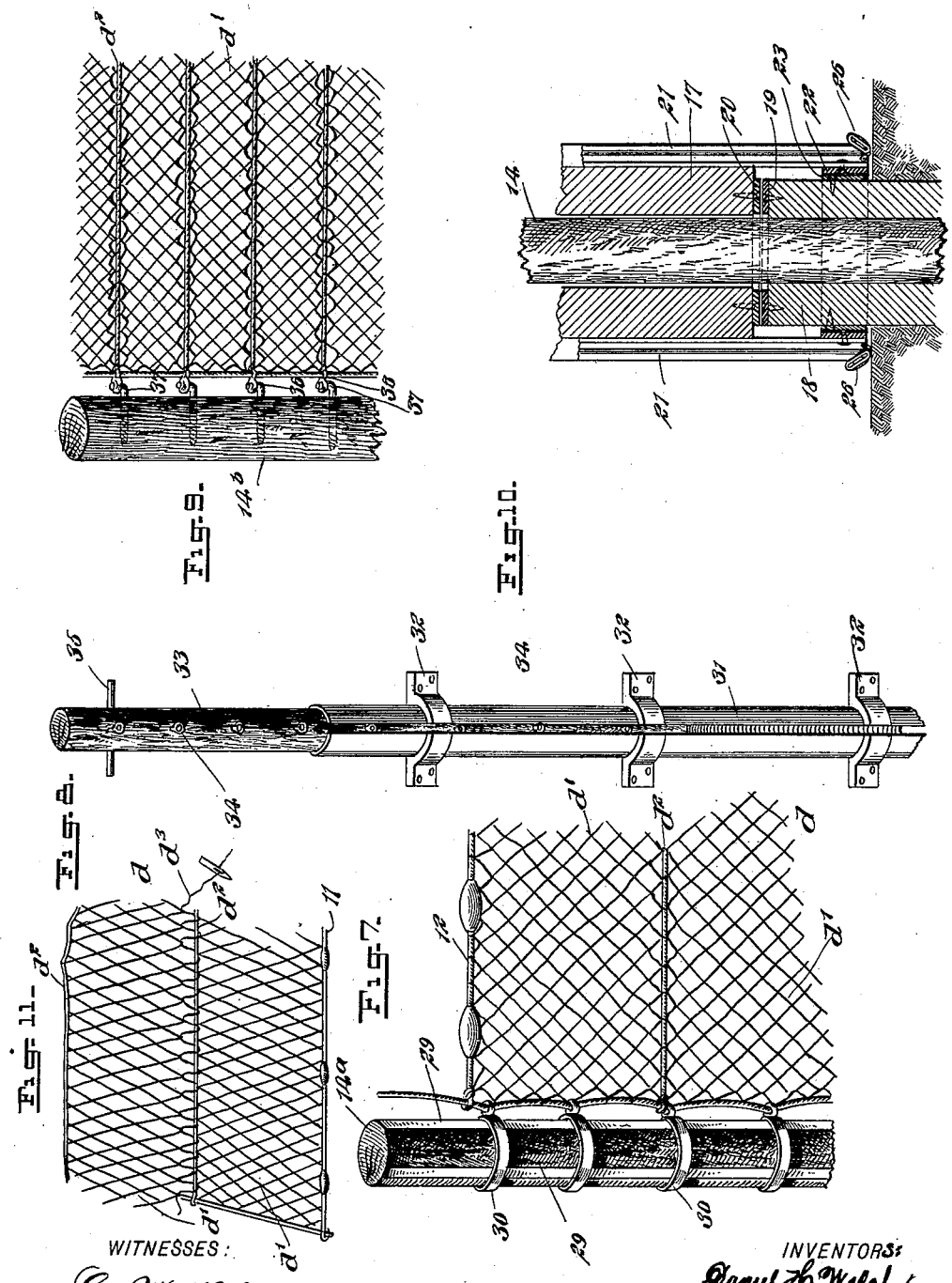

UNITED STATES PATENT OFFICE.

DANIEL H. WELCH AND JOB H. LAMLEY, OF ASTORIA, OREGON.

FISH-TRAP.

SPECIFICATION forming part of Letters Patent No. 667,472, dated February 5, 1901.

Application filed January 16, 1900. Serial No. 1,648. (No model.)

*To all whom it may concern:*

Be it known that we, DANIEL H. WELCH and JOB H. LAMLEY, citizens of the United States, and residents of Astoria, in the county of Clatsop and State of Oregon, have invented a new and Improved Fish-Trap, of which the following is a full, clear, and exact description.

This invention relates to a fish trap or net which is set and into which the fish are led, so as to be entrapped therein; and the object of the invention is to facilitate the capture of the fish by nets of this sort, to which end we provide a movable lead with novel devices for securing one end thereof, between which movable lead and the stationary or main lead of the trap the fish are inclosed, so that they may be forced along the main or stationary lead into the pot or crib of the trap.
This specification is the disclosure of several forms of the invention, while the claims define the actual scope thereof.

Reference is to be had to the accompanying drawings, forming a part of this specification, in which similar characters of reference indicate corresponding parts in all the views.

Figure 1 is a perspective view of the trap to which our invention is applied. Fig. 2 is a diagrammatic view showing the operation of the movable lead. Fig. 3 is a perspective view of the drum to which the inner end of the movable lead is attached. Fig. 4 is a similar view of this part with the net and other rigging in place. Fig. 5 is a fragmentary view of one of the rails or guides of the drum with the net connected. Fig. 6 is a detail view of one of the travelers. Fig 7 is a view of a modification in the means for securing the inner end of the movable lead.
Fig. 8 is a perspective view of a second modification of this means. Fig. 9 is a perspective view of a third modification of these means. Fig. 10 is an enlarged section showing the manner of mounting the drum shown in Figs. 2 and 4, and Fig. 11 is a view showing the construction of the movable lead.

Referring to Fig. 2, the trap to which our invention is here shown as applied is of the usual construction, comprising a lead $a$, (which will be hereinafter designated the "stationary" lead,) a heart $b$, and a pot or crib $c$. According to our invention we employ a net forming a movable lead $d$, one end of which is fastened at the heart $b$, and the other end of which is adapted to be carried by a boat, as shown in Fig. 2. This movable lead $d$ being attached to the boat may be moved circularly outward from the heart toward the outer end of the stationary lead $a$, so as to inclose the fish between the leads $a$ and $d$. Then by moving the boat along the stationary lead toward the heart and gradually hauling the movable lead into the boat the fish are driven along the stationary lead into the heart $b$ and thence to the pot $c$ in the usual manner. As shown best in Figs. 4 and 7, the movable lead $d$ is formed of netting of any suitable mesh having a lead-line 11 at its foot and a float-line 12 at its head. The outer end of the movable lead may be provided with a suitable brail for facilitating its operation, as will be understood by all persons skilled in the art. The movable lead, as illustrated in Fig. 11, is constructed of a number of separable lengths $d'$ of netting fitted with ropes $d^2$ at their edges. These lengths $d'$ are laced together by cords $d^3$. This produces a strong net which is thoroughly roped between its head and foot, such ropes relieving the mesh from the strain which would otherwise be placed thereon.

Various means may be provided for securing the inner end of the movable lead in the position shown in the diagram in Fig. 2. In Figs 1, 3, 4, 5, 6, and 10 we illustrate devices which we consider preferable. A pile 14 or its equivalent is driven into the bottom of the body of water in which the trap is placed, in close proximity to one of the piles 15 of the trap as usually constructed, and any suitable fastenings 16 may be provided for securely connecting the upper ends of these piles 14 and 15, as shown. On the pile 14 is mounted to turn a drum 17, which may be of any desired construction, and which is stepped on a bearing 18, arranged at the bottom of the pile. This bearing 18 is provided with a wear-plate 19 at its top, engaging a similar plate 20 on the bottom end of the drum 17. (See Fig. 10.) Fastened to the drum 17 and extending longitudinally thereof are a number of rails or guides 21, constructed of metal of any suitable form and preferably set into longitudinal grooves in the surface of the drum, as shown. These guides 21 project downward below the lower end of the drum outside of the bearing 18, and their lower ends are fastened rigidly to an annular strap or ring 22, which encircles the bearing 18 and which engages a similar ring 23, fastened to the bearing, so that the ring 22 may revolve freely around the bearing 18. By these means the drum 17 is loosely mounted on the pile to turn freely thereon and be held from displacement. The piles 14 and 15 should be so disposed that the periphery of the drum 17 will be in close proximity to the pile 15, so as to prevent the passage of fish between these two parts, as indicated in Fig. 3.

The movable lead $d$ is provided at its inner end with a number of travelers 24, which are adapted to run on the rails or guides 21. These travelers are fastened to the net at the ropes $d^2$, so as to place the strain on said ropes. The travelers 24 may be of any construction permitting them to slide on the rails or guides and preventing them from being displaced laterally therefrom. The upper ends of the rails or guides 21 are left unobstructed, so that the travelers 24 may be slipped on and off the upper ends of the guides or rails. The lower end of each guide 21 is provided with a block 26, suitably fastened thereto, and over each of these blocks is rove a downhaul-line 27, provided with a snap-hook or the like for engaging it with the bottom traveler 24 at the inner end of the net. By means of this downhaul-line 27, connected with the net, as shown, the net forming the removable lead $d$ may be drawn down to the bottom of the drum, so as to stand with respect to the same as shown in Figs. 1 and 4. An uphaul-line 28 may be attached to the foot of the net, by which to raise the net to the top of the drum.

The device being thus constructed, assuming that it be desired to work the movable lead, the net forming this lead is placed in the boat and the end thereof to which the travelers 24 are attached should be connected with one of the guides 21, the downhaul-line 27 being attached as shown in Fig. 5. Then by hauling on this line 27 the net may be drawn down to the bottom of the drum. The boat may now be used to work the movable lead in the manner previously described. By mounting the drum to turn on the pile 14 we provide a slightly-yielding means of holding the inner end of the net—that is to say, assuming that the tide or other current be setting against the net, the drum will turn slightly on the pile and will ease the work of the crew in the boat, and at the same time will ease the strain on the net and on the parts for securing it. By providing a plurality of rails or guides 21, as shown, the net may be connected to the drum at any desired point on its periphery, and by the repeated use of the movable lead the drum will be caused to turn continuously in steps around the pile, the partial turns being brought about one at each time that the movable lead is worked.

In Fig. 7 we show a modified means for securing the inner end of the movable lead, which consists in a pile 14ª, driven down in close proximity to the piling forming the trap proper. This pile may, if desired, be provided with metallic facing-plates 29 to prevent wear thereon, and working on the piles are a number of hoops 30, to which the net forming the movable lead is attached, as shown. These hoops may be provided with suitable rigging for causing them to move up and down on the pile, and the net forming the movable lead may be set and displaced at will, so that it may be worked in the manner previously described.

Fig. 8 shows a substitute for the guides 21 and travelers 24 to be used in connection with the drum 17 described. This modified form of the invention comprises a number of split tubes 31, secured to the drum by suitable fastenings 32. In each tube 31 is mounted to slide a pile, rod, or the equivalent 33, which is provided with eyes 34, to which the net forming the movable lead $d$ may be fastened. These eyes 34 run in the slot formed in the tube 31, as shown, and the upper end of the rod or pile 33 may be provided with a bar 35, forming the means for permitting the rod or pile 33 to be raised or lowered and also for limiting the downward movement of the rod or pile, which latter effect is attained by the engagement of the bar 35 with the upper end of the tube 31.

It is also possible to permanently fasten the inner end of the net forming the movable lead to a pile 14ᵇ, which may be effected, as shown in Fig. 9, by eyes 36 on the lead engaging with pins or hooks 37 on the pile, the eyes 36 being attached to the net at the ropes $d^2$ thereof.

Various changes in the form, proportions, and minor details of our invention may be resorted to without departing from the spirit and scope of our invention. Hence we consider ourselves entitled to all such variations as may lie within the scope of our claims.

Having thus described our invention, we claim as new and desire to secure by Letters Patent—

1. The combination with a fish-trap, comprising a stationary lead and a pot or crib, of a movable lead, one end of which is fastened near the pot or crib, the movable lead working with the stationary lead, for the purpose specified.

2. In a fishing appliance, the combination of a drum, means for mounting the same on end in the water to roll or turn, and fastening devices for securing a net to the drum.

3. The combination of a drum mounted to turn or roll, a guide or rail secured longitudinally thereon, and travelers mounted to slide on the guide or rail and adapted to carry a net.

4. The combination of a pile or standard, a bearing mounted at the base thereof, a drum mounted to turn on the pile or standard, the lower end of the drum being stepped on the bearing, and means for connecting a net with the drum.

5. The combination of a pile or standard, a bearing mounted at the foot thereof, a drum mounted to turn on the pile or standard and stepped on the bearing, guides or rails attached to the drum and projecting below the same outside of the bearing, and a hoop or ring attached to the lower ends of the guides or rails and encircling the bearing.

6. The combination of a support, a guide or rail mounted thereon, a block mounted at the lower portion of the guide or rail, travelers sliding on the guide or rail, a net to which said travelers are connected, and a downhaul-rope connected with the net and travelers and rove over the block.

7. The combination with a trap, of a movable lead, and a member mounted to roll or turn directly adjacent to the trap, to which member one end of the said movable lead is secured, for the purpose specified.

8. The combination of a fish-trap, comprising an inclosure and means for directing the fish thereinto, a drum mounted directly adjacent to the fish-trap and arranged to turn or roll, the drum standing vertically in the water, and a movable lead, one end of which is fastened to the drum, the other portion of the lead being free to be manipulated, for the purpose specified, and the drum serving as a yielding holder for the secured end of the movable lead.

9. In a fishing appliance, the combination of a drum mounted to stand vertically in the water and arranged to turn or roll, and a movable lead or net, one end of which is fastened to and carried by the drum and the other portion of which is free to be manipulated, for the purpose specified.

In testimony whereof we have signed our names to this specification in the presence of two subscribing witnesses.

DANIEL H. WELCH.
JOB H. LAMLEY.

Witnesses:
J. T. LACEY,
W. C. CASSELL.